(12) United States Patent
Abrego et al.

(10) Patent No.: US 7,272,560 B2
(45) Date of Patent: Sep. 18, 2007

(54) METHODOLOGY FOR PERFORMING A REFINEMENT PROCEDURE TO IMPLEMENT A SPEECH RECOGNITION DICTIONARY

(75) Inventors: Gustavo Hernandez Abrego, San Jose, CA (US); Xavier Menendez-Pidal, Los Gatos, CA (US); Lex Olorenshaw, Half Moon Bay, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 743 days.

(21) Appl. No.: 10/805,840

(22) Filed: Mar. 22, 2004

(65) Prior Publication Data

US 2005/0209854 A1  Sep. 22, 2005

(51) Int. Cl.
*G10L 15/06* (2006.01)
(52) U.S. Cl. ...................................... 704/244
(58) Field of Classification Search ............... None
See application file for complete search history.

(56) References Cited

U.S. PATENT DOCUMENTS 6,076,053 A * 6/2000 Juang et al. ............... 704/236
6,092,044 A  7/2000 Baker et al.

\* cited by examiner

*Primary Examiner*—Abul K. Azad
(74) *Attorney, Agent, or Firm*—Gregory J. Koerner; Redwood Patent Law

(57) ABSTRACT

A system and method for performing a refinement procedure to effectively implement a speech recognition dictionary for spontaneous speech recognition may include a problematic word identifier configured to divide vocabulary words from an initial speech recognition dictionary into problematic words and non-problematic words according to pre-defined identification criteria. A candidate generator may analyze the problematic words to produce one or more pronunciation candidates for each of the problematic words. An optimization module may then perform an optimization process for refining one or more pronunciation candidates according to certain optimization criteria to thereby generate optimized problematic pronunciations. A dictionary refinement manager may finally combine the optimized problematic pronunciations with non-problematic pronunciations of the non-problematic words to produce a refined speech recognition dictionary for use by the speech recognition system.

45 Claims, 10 Drawing Sheets

METHODOLOGY FOR PERFORMING A REFINEMENT PROCEDURE TO IMPLEMENT A SPEECH RECOGNITION DICTIONARY

BACKGROUND SECTION

1. Field of Invention

This invention relates generally to electronic speech recognition systems, and relates more particularly to a system and method for performing a refinement procedure to effectively implement a speech recognition dictionary for spontaneous speech recognition.

2. Description of the Background Art

Implementing a robust and effective methodology for system users to interface with electronic devices is a significant consideration of system designers and manufacturers. Voice-controlled operation of electronic devices may often provide a desirable interface for system users to control and interact with electronic devices. For example, voice-controlled operation of an electronic device may allow a user to perform other tasks simultaneously, or may be advantageous in certain types of operating environments. In addition, hands-free operation of electronic systems may also be desirable for users who have physical limitations or other special requirements.

Hands-free operation of electronic devices may be implemented by various speech-activated electronic systems. Speech-activated electronic systems may thus advantageously allow users to interface with electronic devices in situations where it would be inconvenient or potentially hazardous to utilize a traditional input device. However, effectively implementing such speech recognition systems may create substantial challenges for system designers.

For example, enhanced demands for increased system functionality and performance may require more system processing power and require additional hardware resources. An increase in processing or hardware requirements may also result in a corresponding detrimental economic impact due to increased production costs and operational inefficiencies. Furthermore, enhanced system capability to perform various advanced operations may provide additional benefits to a system user, but may also place increased demands on the control and management of various system components.

Spontaneous speech may include utterances which are spoken under certain informal or extemporaneous circumstances with less than optimal pronunciation or grammatical formulation. For example, spontaneous speech may include, but is not limited to, colloquial speech, slurred speech, stuttering, and mispronunciations. Accurate recognition of such spontaneous speech may present substantial challenges for a speech recognition system due to various informalities, errors, and non-standard constructions in the spontaneous speech.

However, providing reliable accuracy rates during speech recognition of spontaneous speech may be an important factor for optimal performance of speech recognition systems. Therefore, for at least the foregoing reasons, implementing a robust and effective method for a system user to interface with electronic devices through speech recognition remains a significant consideration of system designers and manufacturers.

SUMMARY

In accordance with the present invention, a system and method are disclosed for performing a refinement procedure to effectively implement a speech recognition dictionary for spontaneous speech recognition. In one embodiment, an initial speech recognition dictionary for performing speech recognition procedures may be provided in any effective implementation by utilizing any desired techniques. A dictionary refinement manager then utilizes a problematic word identifier to analyze each vocabulary word from the initial speech recognition dictionary to identify problematic words and non-problematic words according to pre-defined identification criteria.

In certain embodiments, the foregoing pre-defined identification criteria may require that a problematic word have a relatively short duration, have frequent-use characteristics, and have a high likelihood of confusion with other words during the speech recognition process. In certain embodiments, an automatic processing module or other appropriate entity processes non-problematic words received from the problematic word identifier to thereby produce non-problematic pronunciations corresponding to the non-problematic words.

The dictionary refinement manager utilizes a candidate generator to identify one or more pronunciation candidates for each of the problematic words generated by the problematic word identifier. In certain embodiments, the candidate generator utilizes a phonetic recognizer and a sequence analyzer to generate the foregoing pronunciation candidates by utilizing appropriate phonetic recognition and multiple sequence alignment techniques.

The dictionary refinement manager then utilizes an optimization module for performing an optimization process upon the foregoing pronunciation candidates to thereby produce optimized problematic pronunciations. The optimization process may be performed in any effective manner. For example, in certain embodiments, the optimization process may be automatically performed by optimization module according to pre-defined optimization criteria. In alternate embodiments, the optimization module may interactively perform various optimization processes by utilizing user input information from a human speech recognition expert according to certain optimization criteria.

Finally, the dictionary refinement manager advantageously combines the foregoing optimized problematic pronunciations generated by the optimization module with the non-problematic pronunciations provided by the automatic processing module to produce a refined speech recognition dictionary for use during speech recognition procedures. The present invention thus provides an improved system and method for performing a refinement procedure to effectively implement a speech recognition dictionary for spontaneous speech recognition.

DETAILED DESCRIPTION

The present invention relates to an improvement in speech recognition systems. The following description is presented to enable one of ordinary skill in the art to make and use the invention, and is provided in the context of a patent application and its requirements. Various modifications to the embodiments disclosed herein will be apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for performing a refinement procedure to effectively implement a speech recognition dictionary for spontaneous speech recognition, and may include a problematic word identifier configured to divide vocabulary words from an initial speech recognition dictionary into problematic words and non-problematic words according to pre-defined identification criteria. A candidate generator may analyze the problematic words to produce one or more pronunciation candidates for each of the problematic words. An optimization module may then perform an optimization process for refining one or more pronunciation candidates according to certain optimization criteria to thereby generate optimized problematic pronunciations. A dictionary refinement manager may finally combine the optimized problematic pronunciations with non-problematic pronunciations of the non-problematic words to produce a refined speech recognition dictionary for use by the speech recognition system.

Figure 1:
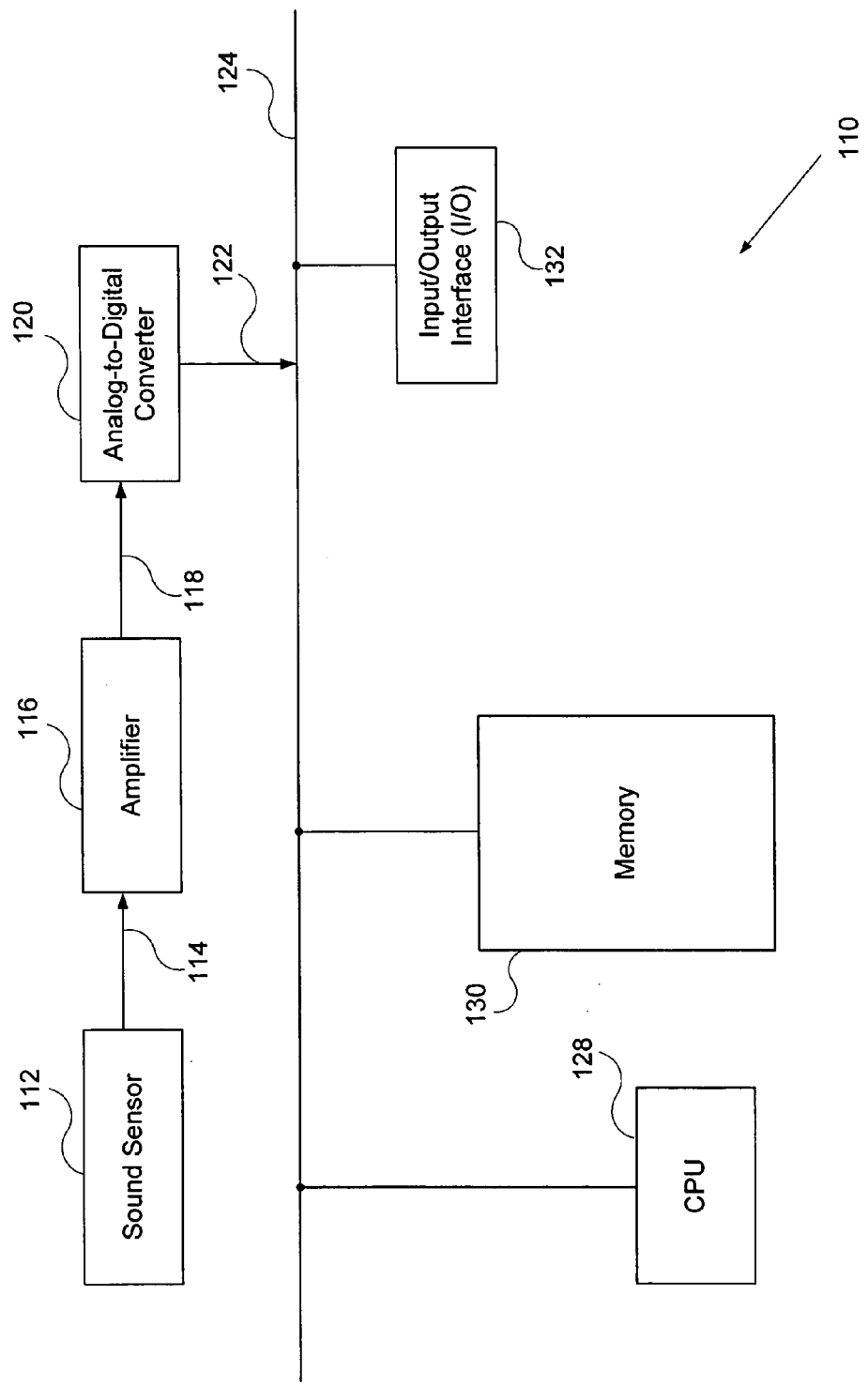
FIG. 1 is a block diagram for one embodiment of an electronic system, in accordance with the present invention.

Referring now to FIG. 1, a block diagram for one embodiment of an electronic system 110 is shown, according to the present invention. The FIG. 1 embodiment includes, but is not limited to, a sound sensor 112, an amplifier 116, an analog-to-digital converter 120, a central processing unit (CPU) 128, a memory 130, and an input/output interface 132. In alternate embodiments, electronic system 110 may readily include various other elements or functionalities in addition to, or instead of, those elements or functionalities discussed in conjunction with the FIG. 1 embodiment.

In the FIG. 1 embodiment, sound sensor 112 detects sound energy from spoken speech, and then converts the detected sound energy into an analog speech signal that is provided via path 114 to amplifier 116. Amplifier 116 may amplify the received analog speech signal, and may provides the amplified analog speech signal to analog-to-digital converter 120 via path 118. Analog-to-digital converter 120 may then convert the amplified analog speech signal into corresponding digital speech data, and may then provide the digital speech data via path 122 to system bus 124.

CPU 128 may access the digital speech data on system bus 124, and may responsively analyze and process the digital speech data to perform speech recognition procedures according to software instructions contained in memory 130. The operation of CPU 128 and the software instructions in memory 130 are further discussed below in conjunction with FIGS. 2-10. After the speech data has been processed, CPU 128 may then provide the results of the speech recognition to other devices (not shown) via input/output interface 132. In alternate embodiments, the present invention may readily be embodied in various electronic devices and systems other than the electronic system 110 shown in FIG. 1. For example, the present invention may be implemented as part of entertainment robots such as AIBO™ and QRIO™ by Sony Corporation.

Figure 2:
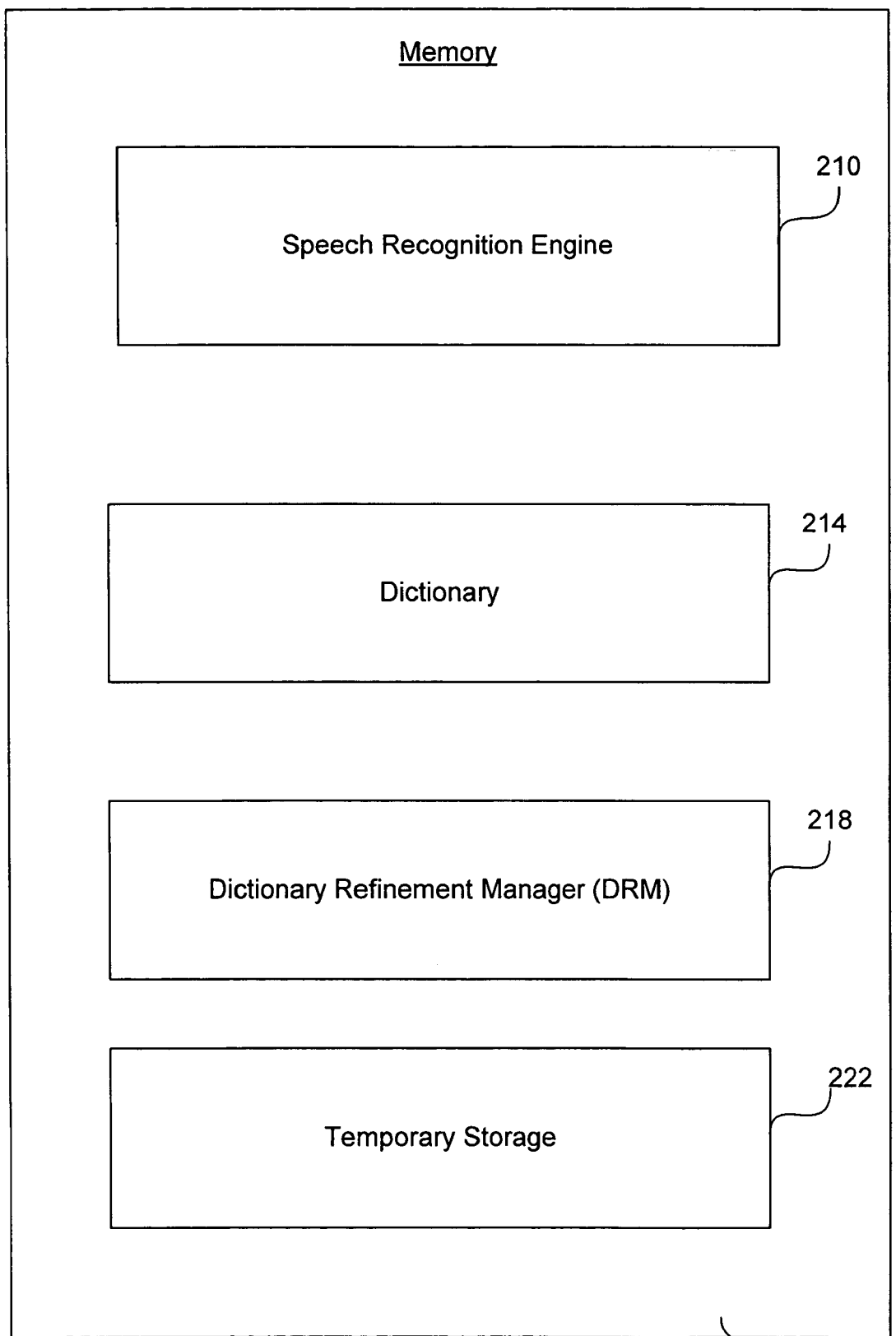
FIG. 2 is a block diagram for one embodiment of the memory of FIG. 1, in accordance with the present invention.

Referring now to FIG. 2, a block diagram for one embodiment of the FIG. 1 memory 130 is shown, according to the present invention. Memory 130 may comprise any desired storage-device configurations, including, but not limited to, random access memory (RAM), read-only memory (ROM), and storage devices such as floppy discs or hard disc drives. In the FIG. 2 embodiment, memory 130 may include a speech recognition engine 210, a dictionary 214, a dictionary refinement manager (DRM) 218, and temporary storage 222. In alternate embodiments, memory 130 may readily include various other elements or functionalities in addition to, or instead of, those elements or functionalities discussed in conjunction with the FIG. 2 embodiment.

In the FIG. 2 embodiment, speech recognition engine 210 may include a series of software modules that are executed by CPU 128 to analyze and recognize input speech data, and which are further described below in conjunction with FIG. 3. In accordance with the present invention, dictionary 214 may be utilized by speech recognition engine 210 to implement the speech recognition functions of the present invention. One embodiment for dictionary 214 is further discussed below in conjunction with FIG. 4.

In the FIG. 2 embodiment, dictionary refinement manager (DRM) 218 may include various modules and other information for performing a refinement procedure to effectively implement dictionary 214 for use in spontaneous speech recognition. Temporary storage 222 may be utilized by electronic system 110 for any appropriate storage of electronic information. The implementation and utilization of dictionary refinement manager 218 is further discussed below in conjunction with FIGS. 5-10.

Figure 3:
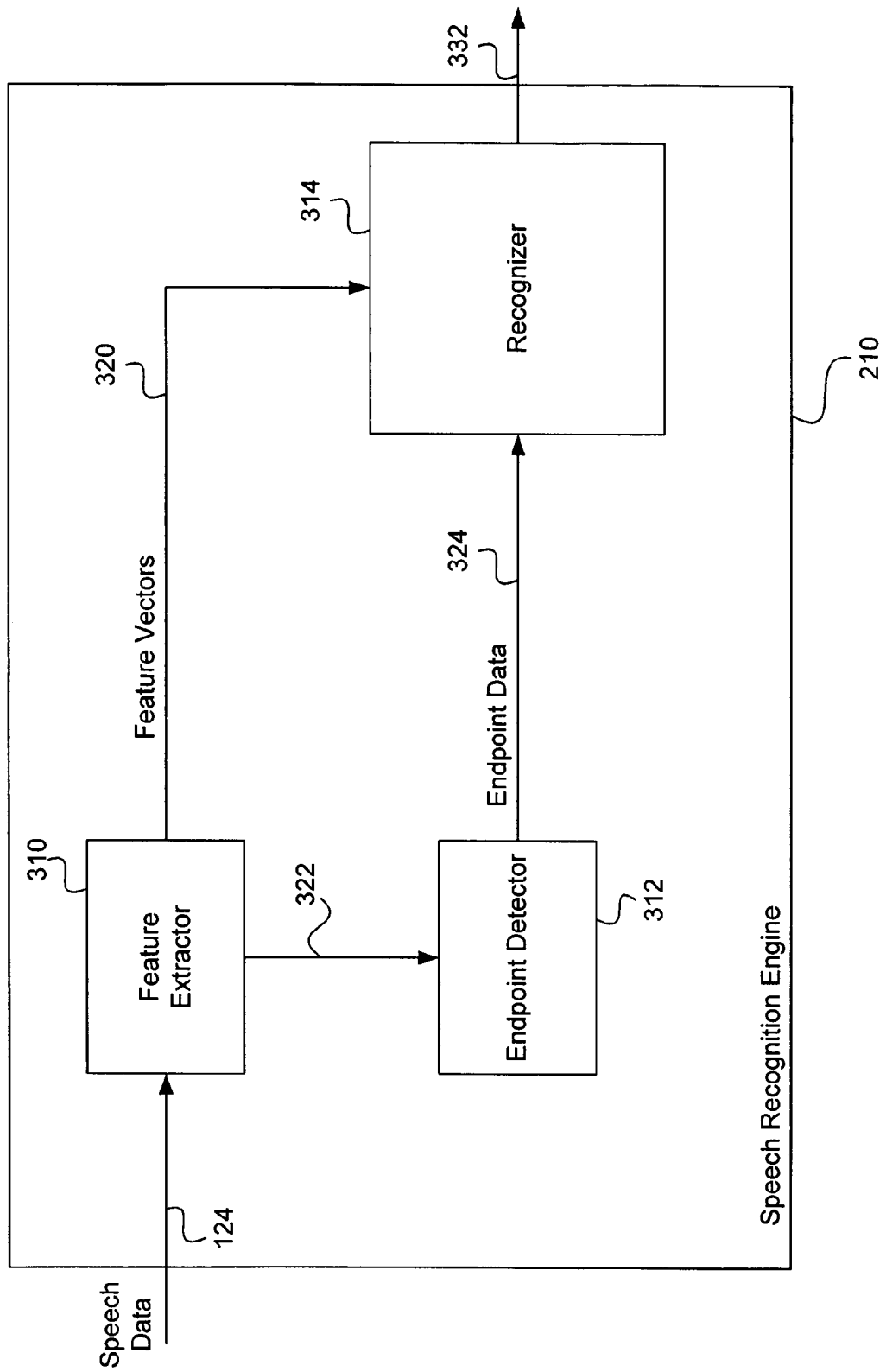
FIG. 3 is a block diagram for one embodiment of the speech recognition engine of FIG. 2, in accordance with the present invention.

Referring now to FIG. 3, a block diagram for one embodiment of the FIG. 2 speech recognition engine 210 is shown, according to the present invention. Speech recognition engine 210 may include, but is not limited to, a feature extractor 310, an endpoint detector 312, and a recognizer 314. In alternate embodiments, speech recognition engine 210 may readily include various other elements or functionalities in addition-to, or instead of, those elements or functionalities discussed in conjunction with the FIG. 3 embodiment.

In the FIG. 3 embodiment, an analog-to-digital converter 120 (FIG. 1) may provide digital speech data to feature extractor 310 via system bus 124. Feature extractor 310 may responsively generate corresponding representative feature vectors, which may be provided to recognizer 314 via path 320. Feature extractor 310 may further provide the speech data to endpoint detector 312 via path 322. Endpoint detector 312 may also analyze the speech data, and may responsively determine endpoints of utterances represented by the speech data. The endpoints indicate the beginning and end of an utterance in time. Endpoint detector 312 may then provide the endpoints to recognizer 314 via path 324.

Recognizer 314 may be configured to recognize words in a predetermined vocabulary which is represented in dictionary 214 (FIG. 2). The foregoing vocabulary in dictionary 214 may correspond to any desired commands, instructions, or other communications for electronic system 110. Recognized vocabulary words or commands may then be output to electronic system 110 via path 332.

In practice, each word from dictionary 214 (FIG. 2) may be associated with a corresponding phone string (string of individual phones) which represents the pronunciation of that word. Trained stochastic representations (such as Hidden Markov Models) for each of the phones may be selected and combined to create the foregoing phone strings for accurately representing pronunciations of words in dictionary 214. Recognizer 314 may then compare input feature vectors from line 320 with the entries (phone strings) from dictionary 214 to determine which word produces the highest recognition score. The word corresponding to the highest recognition score may thus be identified as the recognized word.

Figure 4:
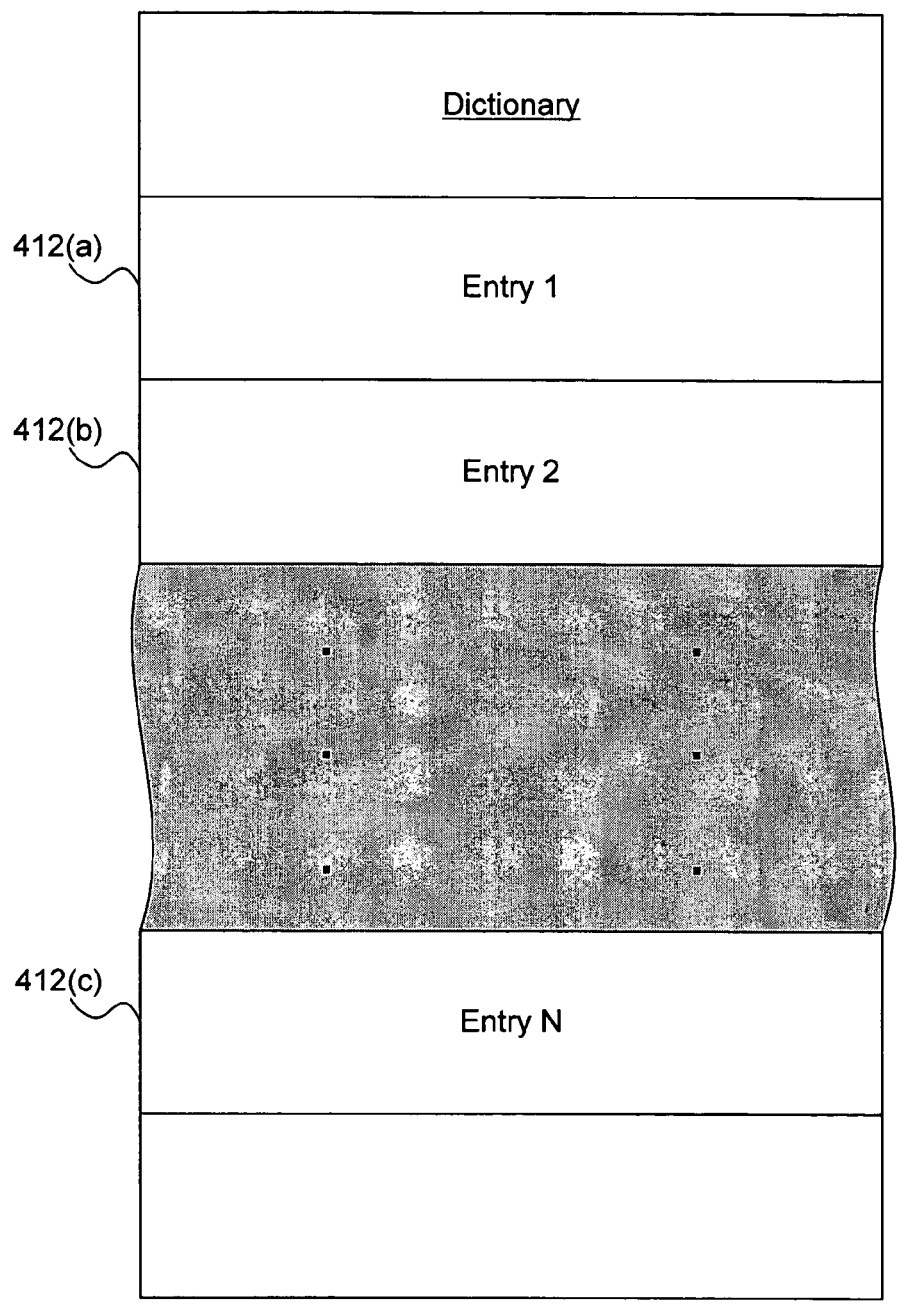
FIG. 4 is a block diagram for one embodiment of the dictionary of FIG. 2, in accordance with the present invention.

Referring now to FIG. 4, a block diagram for one embodiment of the FIG. 2 dictionary 214 is shown, in accordance with the present invention. In the FIG. 4 embodiment, dictionary 214 may include an entry 1 (412(*a*)) through an entry N (412(*c*)). In alternate embodiments, dictionary 214 may readily include various other elements or functionalities in addition to, or instead of, those elements or functionalities discussed in conjunction with the FIG. 4 embodiment.

In the FIG. 4 embodiment, dictionary 214 may readily be implemented to include any desired number of entries 412 that may include any required type of information. In the FIG. 4 embodiment, as discussed above in conjunction with FIG. 3, each entry 412 from dictionary 214 may include vocabulary words and corresponding phone strings of individual phones from a pre-determined phone set. The individual phones of the foregoing phone strings preferably form sequential representations of the pronunciations of corresponding entries 412 from dictionary 214. In certain embodiments, words in dictionary 214 may be represented by multiple pronunciations, so that more than a single entry 412 may thus correspond to the same vocabulary word. Certain embodiments of a refinement procedure for dictionary 214 are further discussed below in conjunction with FIGS. 5-10.

Figure 5:
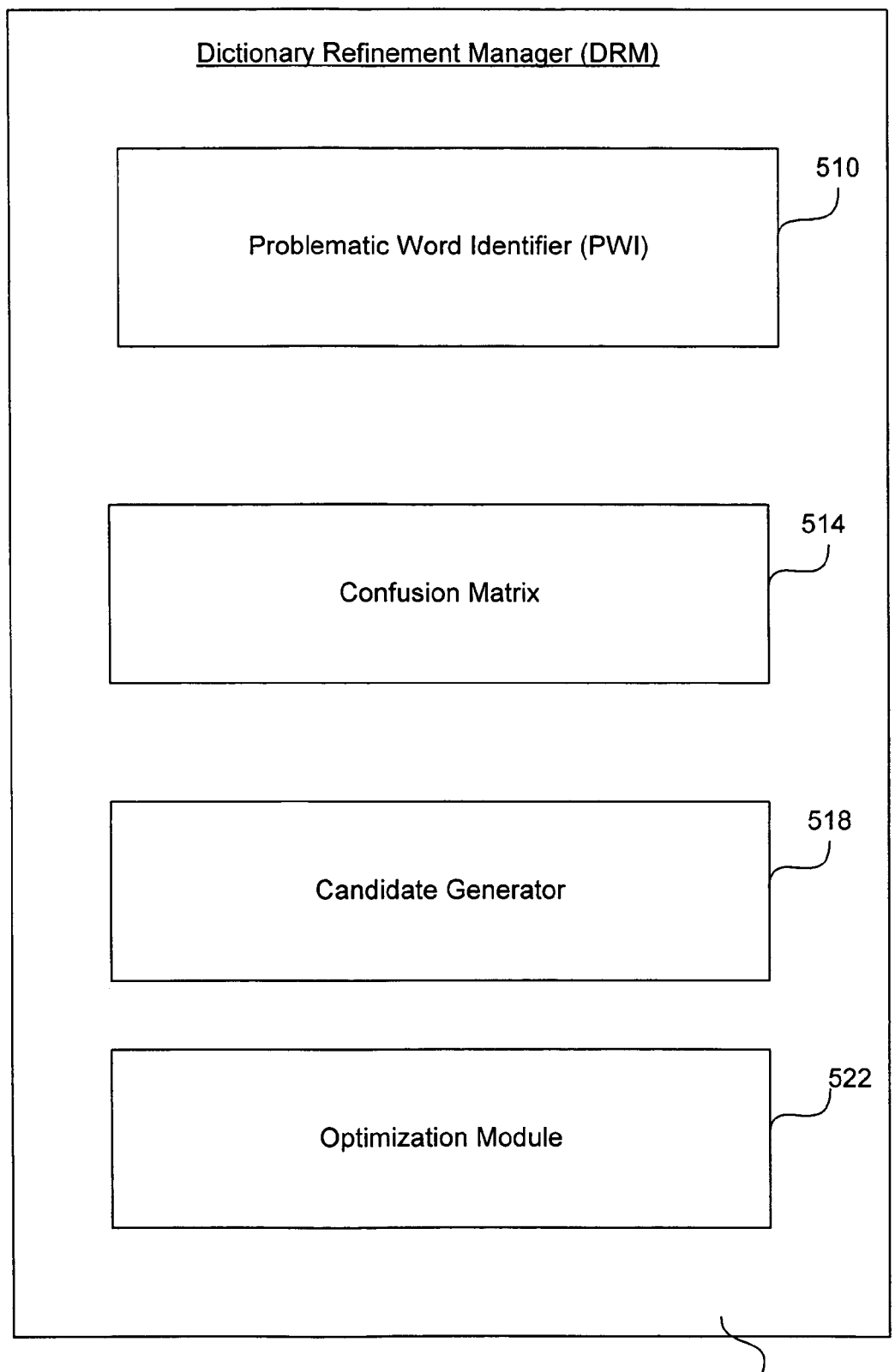
FIG. 5 is a block diagram for one embodiment of the dictionary refinement manager of FIG. 2, in accordance with the present invention.

Referring now to FIG. 5, a block diagram for one embodiment of the FIG. 2 dictionary refinement manager (DRM) 218 is shown, according to the present invention. In the FIG. 5 embodiment, DRM 218 includes, but is not limited to, a problematic word identifier (PWI) 510, a confusion matrix 514, a candidate generator 518, and an optimization module 522. In alternate embodiments, DRM 218 may readily include various other elements and functionalities in addition to, or instead of, those elements or functionalities discussed in conjunction with the FIG. 5 embodiment.

In the FIG. 5 embodiment, DRM 218 utilizes problematic word identifier (PWI) 510 to analyze words from dictionary 214 (FIG. 4) for identifying certain problematic words according to pre-defined identification criteria. The operation of PWI 510 is further discussed below in conjunction with FIGS. 6 and 10. In the FIG. 5 embodiment, confusion matrix 514 may be implemented in any effective manner to include separate recognition error rates for each of the words in dictionary 214 as compared with each of the other words in dictionary 214. For example, in certain embodiments of confusion matrix 514, a separate recognition error rate (sometimes expressed as a percentage) may be included for each pair of words in dictionary 214 to indicate how often a given word is incorrectly recognized as the other word.

In the FIG. 5 embodiment, DRM 218 utilizes candidate generator 518 to generate pronunciation candidates for the foregoing problematic words identified by PWI 510. The implementation and functionality of certain embodiments of candidate generator 518 are further discussed below in conjunction with FIGS. 6, 7, and 10. In the FIG. 5 embodiment, DRM 218 utilizes optimization module 522 to perform an optimization process upon the foregoing pronunciation candidates provided by candidate generator 518. The implementation and functionality of certain embodiments of optimization module 522 are discussed below in conjunction with FIGS. 6-10.

Figure 6:
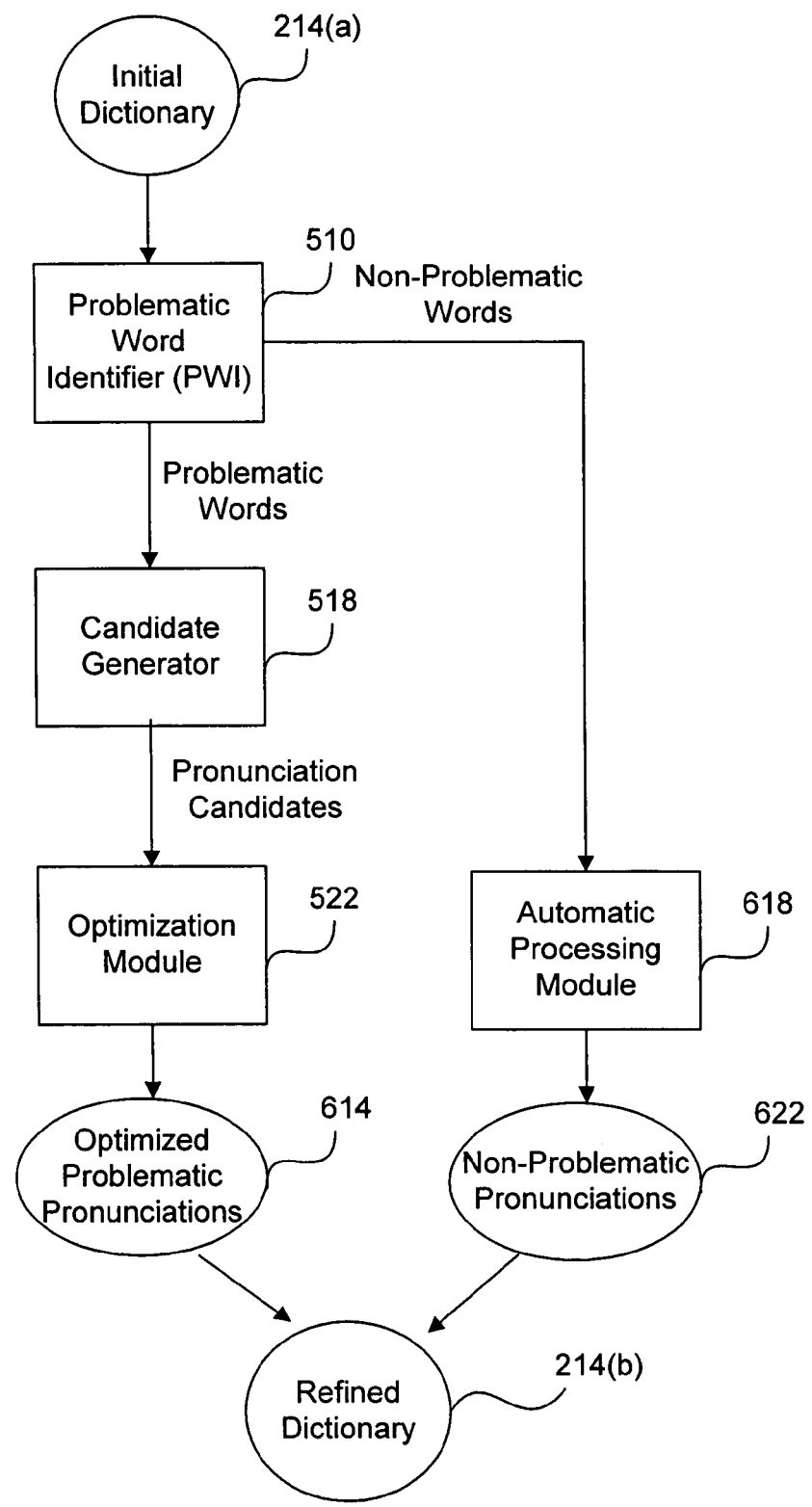
FIG. 6 is a block diagram illustrating a refinement procedure to effectively implement a speech recognition dictionary, in accordance with one embodiment of the present invention.

Referring now to FIG. 6, a diagram illustrating a refinement procedure to effectively implement a speech recognition dictionary is shown, in accordance with one embodiment of the present invention. In alternate embodiments, the present invention may readily perform dictionary refinement procedures using various techniques or functionalities in addition to, or instead of, those techniques or functionalities discussed in conjunction with the FIG. 6 embodiment.

In the FIG. 6 embodiment, an initial dictionary 214(*a*) for speech recognition may be provided in any desired manner and in any effective implementation. Problematic word identifier (PWI) 510 analyzes each word from initial dictionary 214(*a*) to identify certain problematic words according to pre-defined identification criteria. The problematic words may include certain words which may advantageously be utilized for generating additional pronunciations for dictionary 214 to thereby significantly improve speech recognition accuracy. In certain embodiments, the problematic words may include, but are not limited to, "a," "and," "i," "in," "it," "of," "that," "the," "to," "uh," "um," and "you."

In the FIG. 6 embodiment, the foregoing pre-defined identification criteria may require that a problematic word have relatively short duration characteristics. For example, in certain embodiments, a problematic word may be required to have less than a specified number of letters (e.g., less than four or five letters). In other embodiments, other criteria, such as the number of syllables or the number of phones in a word, may also be utilized to quantify duration. A problematic word may also be required to have frequent use characteristics in the subject spoken language. In certain embodiments, a large training database of representative speech samples may be analyzed to determine typical frequencies with which words from dictionary 214 are normally utilized in speech.

In addition, a problematic word may be required to have a high likelihood of confusion with other words during the speech recognition process. In the FIG. 6 embodiment, information from confusion matrix 514 may be utilized to determine which words from dictionary 214 have a high likelihood of confusion with other words during the speech recognition process. In certain embodiments, all or only selected ones of the foregoing criteria may be required to identify problematic words. In addition, in various alternate embodiments, other appropriate criteria may also be defined and utilized by PWI 510.

In the FIG. 6 embodiment, candidate generator 518 receives the problematic words from PWI 510, and responsively generates one or more pronunciation candidates corresponding to each of the problematic words. The implementation and functionality for one embodiment of candidate generator 518 is further discussed below in conjunction with FIG. 7. In the FIG. 6 embodiment, optimization module 522 then receives the pronunciation candidates from candidate generator 518, and responsively performs an optimization process upon the foregoing pronunciation candidates to produce optimized problematic pronunciations 614.

In certain embodiments of the present invention, the foregoing optimization process may be automatically performed by optimization module 522 by utilizing any appropriate and effective techniques. For example, optimization module 522 may automatically perform various optimization processes according to pre-defined optimization criteria by utilizing an expert system or a fuzzy logic system. Alternately, optimization module 522 may interactively perform various optimization processes by utilizing user input information from a human speech recognition expert according to appropriate optimization criteria. The implementation and functionality of certain embodiments of optimization module 522 are further discussed below in conjunction with FIGS. 7 and 8.

In the FIG. 6 embodiment, non-problematic words identified by PWI 510 may optionally receive appropriate processing from automatic processing module 618 to produce non-problematic pronunciations 622. For example, in certain embodiments, automatic processing module 618 may perform a pronunciation pruning procedure to reduce the total number of different pronunciations corresponding to certain non-problematic words from initial dictionary 214 (a).

Finally, DRM 218 merges optimized problematic pronunciations 614 with non-problematic pronunciations 622 to produce a refined dictionary 214(b) for use by speech recognition engine 210 (FIG. 2). In certain embodiments, DRM 218 may iteratively regenerate subsequent refined speech recognition dictionaries 214(b) to further improve recognition accuracy rates of speech recognition for spontaneous speech. The present invention thus provides an improved system and method for performing a refinement procedure to effectively implement a speech recognition dictionary for spontaneous speech recognition.

Figure 7:
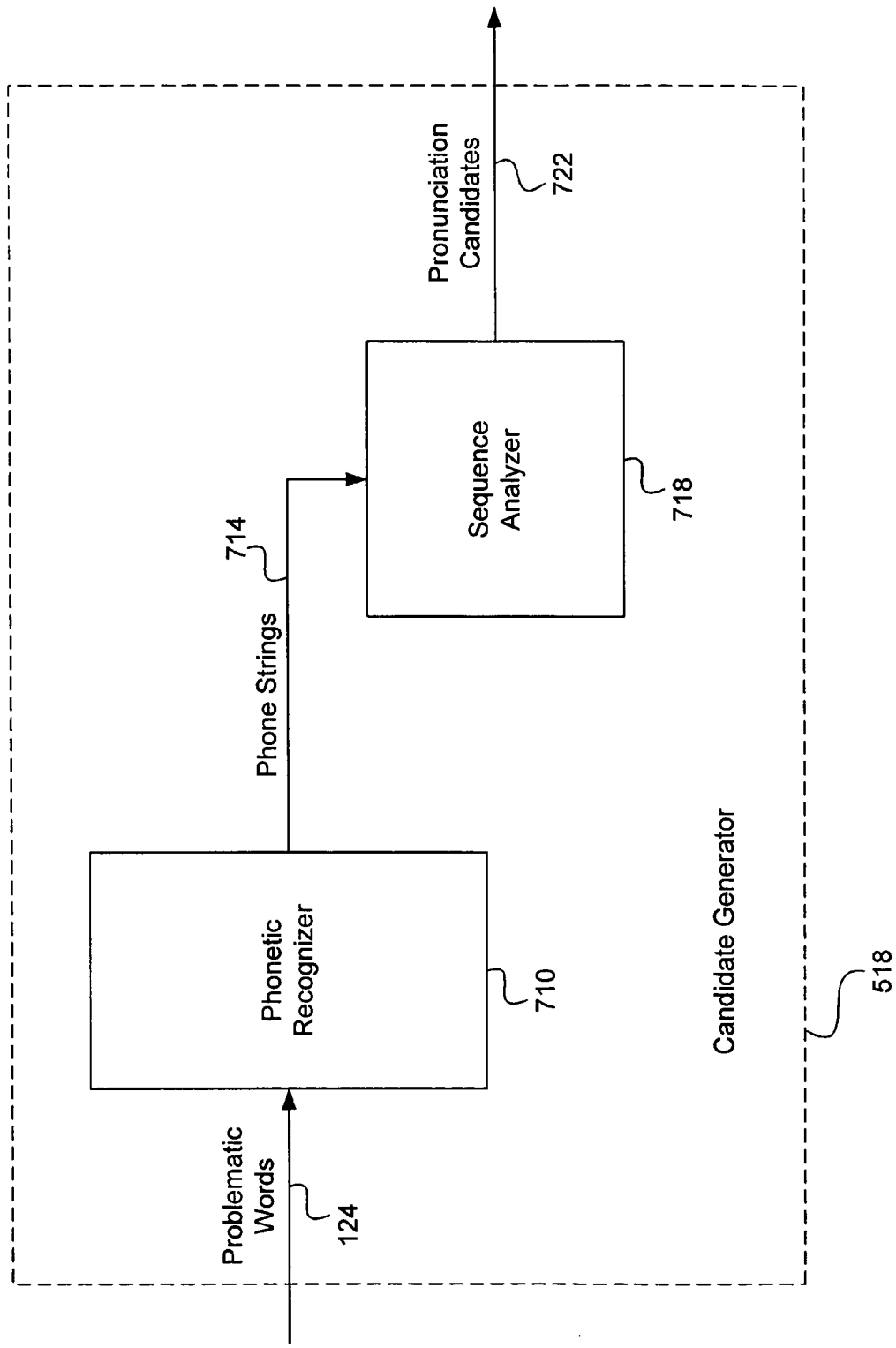
FIG. 7 is a block diagram for one embodiment of the candidate generator of FIG. 5, in accordance with the present invention.

Referring now to FIG. 7, a block diagram for one embodiment of the FIG. 5 candidate generator 518 is shown, in accordance with the present invention. In the FIG. 7 embodiment, candidate generator 518 may include, but is not limited to, a phonetic recognizer 710 and a sequence analyzer 718. In alternate embodiments, candidate recognizer 518 may readily include various other elements and functionalities in addition to, or instead of, those elements or functionalities discussed in conjunction with the FIG. 7 embodiment.

In the FIG. 7 embodiment, candidate generator 518 may sequentially utilize a phonetic recognizer 710 to process speech data from different utterances of each of the problematic words received from problematic word generator 510 via path 124 to thereby produce individual phone strings that each represent corresponding pronunciations of respective problematic words. In the FIG. 7 embodiment, candidate generator 518 may then sequentially provide different sets of the foregoing phone strings corresponding to each of the problematic words to a sequence analyzer 718 via path 714.

In the FIG. 7 embodiment, sequence analyzer 718 may then analyze each set of the phone strings using any effective and appropriate techniques to thereby generate one or more pronunciation candidates for each of the problematic words via path 722. In certain embodiments, sequence analyzer 718 may perform one or more multiple sequence alignment procedures upon the various phone strings of a given problematic word to effectively generate the pronunciation candidates. For example, sequence analyzer 718 may align the phone strings for a given problematic word, and may then compare corresponding phones in each phone position of the phone strings to determine whether the aligned phones are the same or different.

In certain embodiments, a consensus pronunciation candidate, a majority pronunciation candidate, or a plurality pronunciation candidate may be defined for each problematic word depending upon the degree of similarity in the foregoing comparisons between corresponding phones of the phone strings. A consensus pronunciation candidate may indicate that all phones are the same, a majority pronunciation candidate may indicate that more than fifty percent of the phones are the same, and a plurality pronunciation candidate may indicate that at least some of the phones are the same. In certain embodiments, sequence analyzer 718 may utilize a known software program entitled Clustalw, version 1.8, by Julie Thompson and Toby Gibson, European Molecular Biology Laboratory, Heidelberg, Germany, during the foregoing multiple sequence alignment procedures. The utilization of candidate generator is further discussed below in conjunction with FIG. 10.

Figure 8:
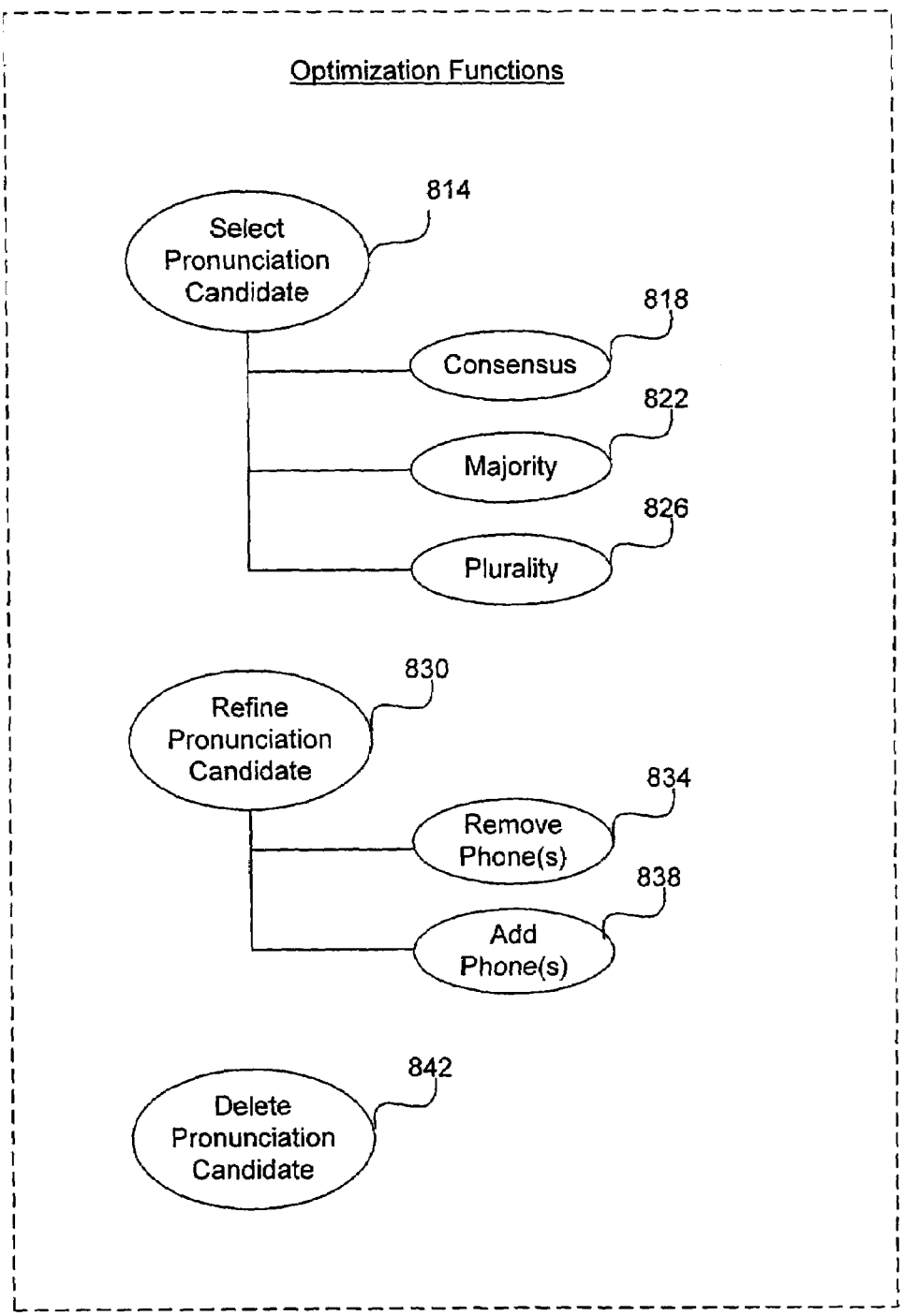
FIG. 8 is a conceptual diagram for one embodiment of optimization functions, in accordance with the present invention.

Referring now to FIG. 8, a conceptual diagram for one embodiment of optimization functions 810 is shown, in accordance with the present invention. In the FIG. 8 embodiment, as discussed above in conjunction with FIG. 6, optimization module 522 may operate either automatically or with human system user interaction and instruction. In either case, optimization module 522 may advantageously optimize pronunciation candidates received from candidate generator 518 in accordance with certain pre-defined optimization criteria.

In the FIG. 8 embodiment, optimization module 522 may perform various optimization functions 810 to select (814) a given pronunciation candidate as an optimized problematic pronunciation 614 (FIG. 6), refine (830) a given pronunciation candidate to produce an optimized problematic pronunciation 614, or delete (842) a given pronunciation candidate. In alternate embodiments, optimization module 522 may readily support optimization functions that include various other elements and functionalities in addition to, or instead of, those elements or functionalities discussed in conjunction with the FIG. 8 embodiment.

In the FIG. 8 embodiment, when selecting a given pronunciation candidate as an optimized problematic pronunciation 614, optimization module 522 may select either a consensus pronunciation candidate 818, a majority pronunciation candidate 822, or a plurality pronunciation candidate 826, as discussed above in conjunction with FIG. 7. In the FIG. 8 embodiment, when refining a given pronunciation candidate to produce an optimized problematic pronunciation 614, optimization module 522 may remove (834) one or more phones from a pronunciation candidate, and may also add (838) one or more phones to a pronunciation candidate.

Optimization module 522 may refine a given pronunciation candidate using any appropriate optimization criteria. For example, optimization module 522 may refine a given pronunciation candidate based upon phonological rules of assimilation and coarticulation of the subject language, or may also consider the physical limitations of the human vocal track with regard to producing various phone sequences. In addition, optimization module 522 may refine a given pronunciation candidate based upon contextual conditions such as inappropriate sequences of words or phones. Furthermore, optimization module 522 may refine a given pronunciation based upon characteristics of certain dialectal and accent variations.

In the FIG. 8 embodiment, optimization module 522 may delete a pronunciation candidate for a variety of reasons. For example, in order to optimize recognition accuracy, optimization module 522 may delete a pronunciation candidate for a given problematic word when the recognition error rate between that problematic word and another word in dictionary 214 exceeds a certain pre-defined threshold error level. In the FIG. 8 embodiment, optimization module 522 may obtain information regarding the foregoing recognition error rates from confusion matrix 514, as discussed above in conjunction with FIG. 5. The utilization of optimization module 522 is further discussed below in conjunction with FIG. 10.

Figure 9:
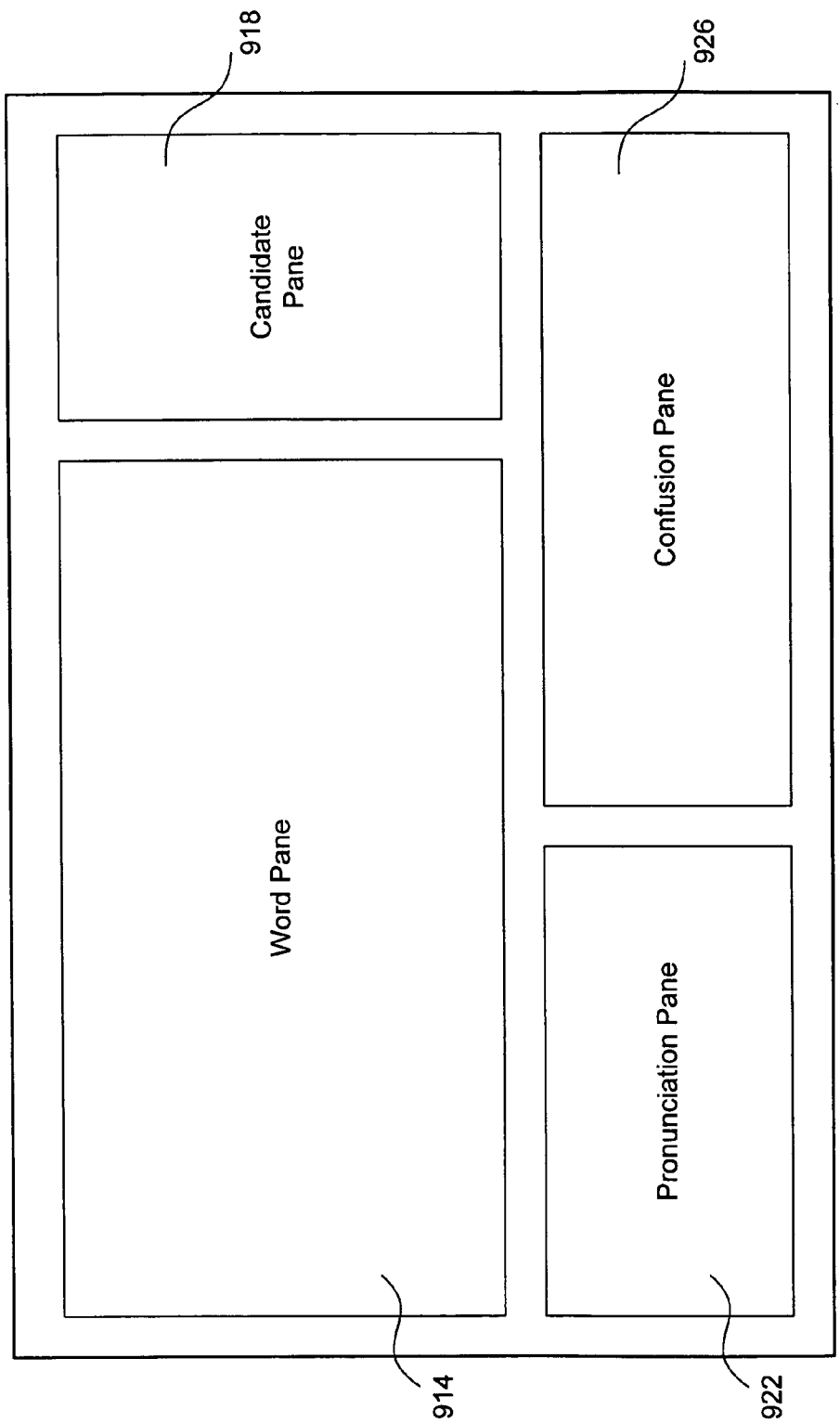
FIG. 9 is a diagram for one embodiment of an optimization graphical user interface, in accordance with the present invention.

Referring now to FIG. 9, a block diagram for one embodiment of an optimization graphical user interface (GUI) 910 is shown, in accordance with the present invention. In the FIG. 9 embodiment, optimization GUI 910 may include, but is not limited to, a word pane 914, a candidate pane 918, a pronunciation pane 922, and a confusion pane 926. In alternate embodiments, optimization GUI 910 may readily include various other elements and functionalities in addition to, or instead of, those elements or functionalities discussed in conjunction with the FIG. 9 embodiment.

In the FIG. 9 embodiment, optimization module 522 may advantageously generate optimization GUI 910 for a system user to interactively participate in an optimization process for converting pronunciation candidates into optimized problematic pronunciations 614 (FIG. 6). In the FIG. 9 embodiment, word pane 914 may include, but is not limited to, certain contents of dictionary 214 (FIG. 2) that match search criteria supplied by the system user. For example, word pane 914 may display one or more words from dictionary 214, word lengths for the displayed words, pronunciations (phone strings) for the displayed words, total numbers of other words in dictionary 214 that share pronunciations with the displayed words, and recognition accuracy rates provided from confusion matrix 514 (FIG. 5).

In the FIG. 9 embodiment, optimization GUI 910 may also include a candidate pane 918 that may display a consensus pronunciation candidate 818, a majority pronunciation candidate 822, and a plurality pronunciation candidate 826 for a given word selected from word pane 914, as discussed above in conjunction with FIG. 7. Similarly, optimization GUI 910 may include a pronunciation pane 922 that shows all possible pronunciations in dictionary 214 for a given word selected from word pane 914. In addition, optimization GUI 910 may include a confusion pane 926 which displays words from dictionary 214 that have the same pronunciation as a given word selected from pronunciation pane 922 along with corresponding recognition error rates. In accordance with certain embodiments, a system user with expertise in speech recognition may effectively utilize optimization GUI 910 to interact with optimization module 522 during various optimization processes to transform pronunciation candidates into optimized problematic pronunciations.

Figure 10:
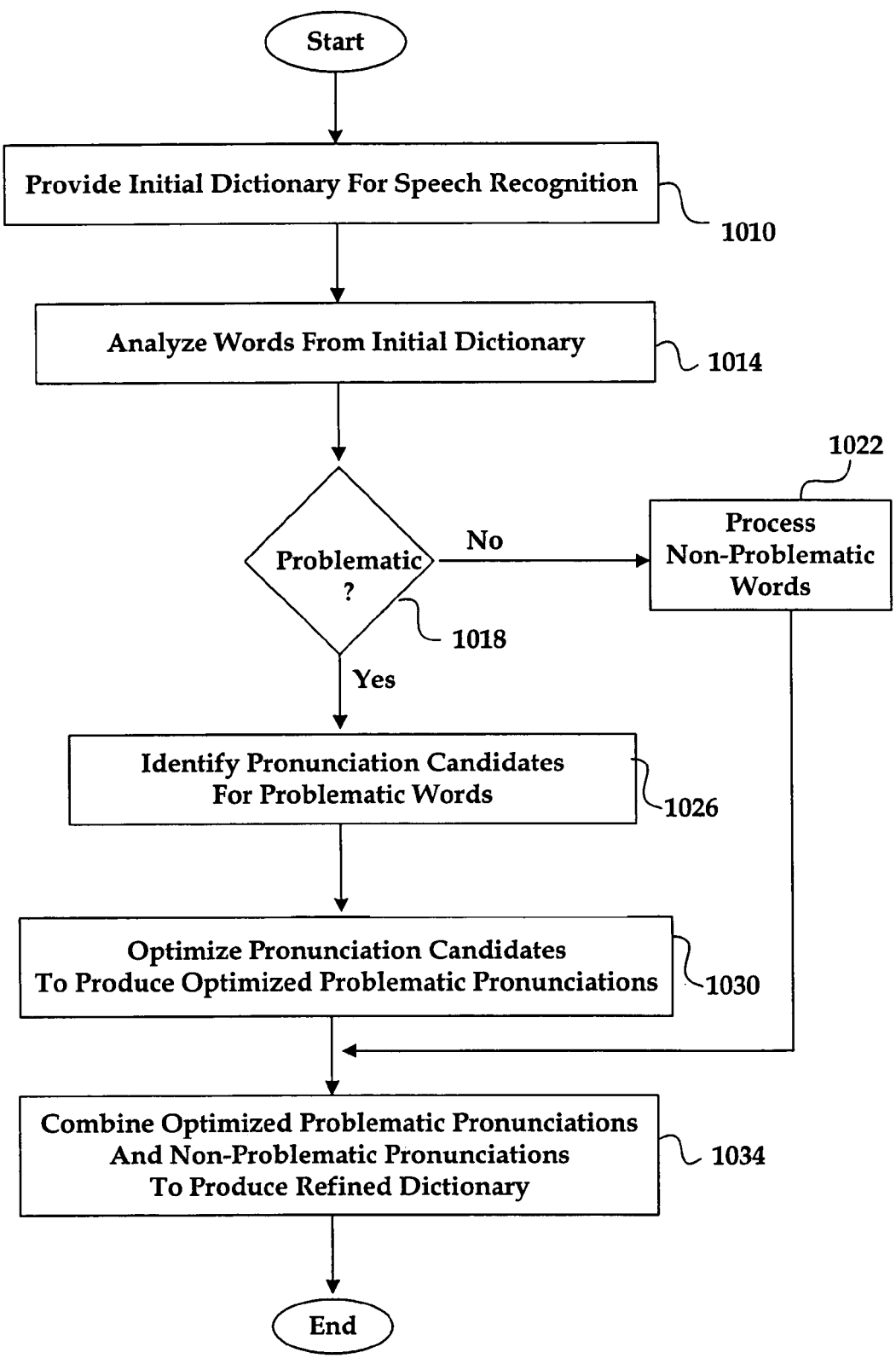
FIG. 10 is a flowchart of method steps for performing a refinement procedure to effectively implement a speech recognition dictionary, in accordance with one embodiment of the present invention.

Referring now to FIG. 10, a flowchart of method steps for performing a refinement procedure to effectively implement a speech recognition dictionary is shown, in accordance with one embodiment of the present invention. The FIG. 10 flowchart is presented for purposes of illustration, and in alternate embodiments, the present invention may readily utilize various steps and sequences other than those discussed in conjunction with the FIG. 10 embodiment.

In the FIG. 10 embodiment, in step 1010, an initial dictionary 214(a) for performing speech recognition procedures may be provided in any effective implementation by utilizing any desired techniques. In step 1014, a dictionary refinement manager 218 may utilize a problematic word identifier 510 for analyzing each word from initial dictionary 214(a). In step 1018, problematic word identifier 510 may identify certain problematic words and certain non-problematic words according to pre-defined identification criteria. In the FIG. 10 embodiment, the foregoing pre-defined identification criteria may simultaneously require that a problematic word have a relatively short duration, have frequent use characteristics, and have a high likelihood of confusion with other words during the speech recognition process.

In step 1022, an automatic processing module 618 or other appropriate entity may optionally process non-problematic words received from problematic word identifier 510 to produce non-problematic pronunciations 622 corresponding to the non-problematic words. In step 1026, dictionary refinement manager 218 may utilize a candidate generator 518 to identify one or more pronunciation candidates for each of the problematic words received from problematic word identifier 510. In the FIG. 10 embodiment, candidate generator 518 may utilize a phonetic recognizer 710 and a sequence analyzer 718 to generate the foregoing pronunciation candidates by utilizing appropriate phonetic recognition and multiple sequence alignment techniques.

In step 1030, dictionary refinement manager 218 may utilize an optimization module 522 for performing an optimization process upon the foregoing pronunciation candidates to thereby produce optimized problematic pronunciations 614. The optimization process may be performed in any effective manner. For example, the optimization process may be automatically performed by optimization module 522 according to pre-defined optimization criteria, or optimization module 522 may interactively perform various optimization processes by utilizing user input information from a human speech recognition expert according to certain appropriate optimization criteria.

Finally, in step 1034, dictionary refinement manager 218 may advantageously combine the foregoing optimized problematic pronunciations 614 from optimization module 522 with the non-problematic pronunciations 622 from automatic processing module 618 to produce a refined dictionary 214(b) for use by speech recognition engine 210. The present invention thus provides an improved system and method for performing a refinement procedure to effectively implement a speech recognition dictionary for spontaneous speech recognition.

The invention has been explained above with reference to certain preferred embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above as the preferred embodiments. Therefore, these and other variations upon the foregoing embodiments are intended to be covered by the present invention, which is limited only by the appended claims.

What is claimed is:

1. A speech recognition refinement system comprising:
   a problematic word identifier that divides initial vocabulary words from an initial speech recognition dictionary into problematic words and non-problematic words according to pre-defined identification criteria;

a candidate generator that analyzes said problematic words to produce one or more pronunciation candidates for each of said problematic words;

an optimization module that performs an optimization process for refining said one or more pronunciation candidates according to one or more optimization criteria, said optimization process generating optimized problematic pronunciations; and a dictionary refinement manager that combines said optimized problematic pronunciations with non-problematic pronunciations of said non-problematic words to produce a refined speech recognition dictionary for use by a speech recognition system.

2. The system of claim 1 wherein said pre-defined identification criteria require that said problematic words each have a short-duration characteristic, a common-use characteristic, and a high recognition-error characteristic.

3. The system of claim 1 wherein said pre-defined identification criteria include a short-duration characteristic which requires that said problematic words each be spelled with fewer than five letters.

4. The system of claim 1 wherein said pre-defined identification criteria include a common-use characteristic that is quantified by analyzing an extensive training database of speech samples to determine which of said initial vocabulary words are frequently represented in said extensive training database.

5. The system of claim 1 wherein said pre-defined identification criteria include a high recognition-error characteristic that is quantified by referring to a confusion matrix that includes separate recognition error rates for each of said initial vocabulary words in said initial speech recognition dictionary when compared with all other of said initial vocabulary words in said initial speech recognition dictionary.

6. The system of claim 1 wherein said candidate generator includes a phonetic recognizer that generates phone strings corresponding to said problematic words, said candidate generator also including a sequence analyzer that performs a multiple sequence analysis procedure upon said phone strings to produce said pronunciation candidates.

7. The system of claim 1 wherein said candidate generator includes a phonetic recognizer that sequentially processes speech data from multiple different utterances for each of said problematic words to produce individual phone strings that each represent corresponding intermediate pronunciations of respective ones of said problematic words.

8. The system of claim 1 wherein said candidate generator includes a sequence analyzer that perform one or more multiple sequence alignment procedures upon phone strings derived for each of said problematic words, said sequence analyzer aligning said phone strings, and then comparing corresponding phones in each phone position of said phone strings to determine whether said corresponding phones indicate a consensus for identifying said pronunciation candidates.

9. The system of claim 1 wherein said optimization process supports optimization functions that include selecting said pronunciation candidates, refining said pronunciation candidates, and deleting said pronunciation candidates.

10. The system of claim 1 wherein said optimization process supports optimization functions that include selecting said pronunciation candidates for said refined speech recognition dictionary by choosing from consensus pronunciation candidates, majority pronunciation candidates, and plurality pronunciation candidates.

11. The system of claim 1 wherein said optimization process supports optimization functions that include refining said pronunciation candidates by adding or removing phones from said pronunciation candidates according to refinement criteria that include phonological rules of assimilation and coarticulation, physical limitations of human vocal tracks with regard to producing certain phone sequences, contextual conditions such as inappropriate sequences of words and phones, and characteristics of dialectal and accent variations.

12. The system of claim 1 wherein said optimization process supports optimization functions that include deleting said pronunciation candidates when recognition-error rates exceed a certain pre-defined threshold error level, said recognition-error rates being accessed from a confusion matrix.

13. The system of claim 1 wherein said optimization module automatically performs said optimization process according to said pre-defined optimization criteria by utilizing an expert system.

14. The system of claim 1 wherein said optimization module generates an optimization graphical user interface for a system user to interactively participate in said optimization process for converting said pronunciation candidates into said optimized problematic pronunciations.

15. The system of claim 14 wherein said optimization graphical user interface includes a word pane that displays selected entries from said initial speech recognition dictionary that match search criteria supplied by a system user, said word pane also displaying word lengths for said selected entries, pronunciations for said selected entries, total numbers of said initial vocabulary words from said speech recognition dictionary that share common pronunciations with said selected entries, and recognition accuracy rates for said selected entries provided from a confusion matrix.

16. The system of claim 14 wherein said optimization graphical user interface includes a candidate pane that displays a consensus pronunciation candidate, a majority pronunciation candidate, and a plurality pronunciation candidate for one of said initial vocabulary words selected from a word pane.

17. The system of claim 14 wherein said optimization graphical user interface includes a pronunciation pane that shows all initial pronunciations in said speech recognition dictionary for one of said initial vocabulary words selected from a word pane.

18. The system of claim 14 wherein said optimization graphical user interface includes a confusion pane that displays selected ones of said initial vocabulary words from said initial speech recognition dictionary that have an identical pronunciation that conflicts with a selected pronunciation from a pronunciation pane, said confusion pane also displaying corresponding respective recognition error rates.

19. The system of claim 1 wherein said problematic word identifier, said candidate generator, and said optimization module are implemented as part of said dictionary refinement manager, said dictionary refinement manager producing said refined speech recognition dictionary to improve speech recognition accuracy for spontaneous speech that includes certain spoken informalities which are incorporated into said optimized problematic pronunciations.

20. The system of claim 1 wherein said refined speech recognition dictionary is utilized by said speech recognition system during speech recognition procedures instead of using said initial speech recognition dictionary, said problematic word identifier, said candidate generator, said optimization module, and said dictionary refinement manager iteratively regenerating subsequent refined speech recognition dictionaries to further improve recognition accuracy rates of said speech recognition system for spontaneous speech.

21. A speech recognition refinement method comprising:
dividing initial vocabulary words from an initial speech recognition dictionary into problematic words and non-problematic words according to pre-defined identification criteria by utilizing a problematic word identifier;
analyzing said problematic words with a candidate generator to produce one or more pronunciation candidates for each of said problematic words;
performing an optimization process with an optimization module to refine said one or more pronunciation candidates according to one or more optimization criteria, said optimization process generating optimized problematic pronunciations; and
utilizing a dictionary refinement manager to combine said optimized problematic pronunciations with non-problematic pronunciations of said non-problematic words to produce a refined speech recognition dictionary for use by a speech recognition system.

22. The method of claim 21 wherein said pre-defined identification criteria require that said problematic words each have a short-duration characteristic, a common-use characteristic, and a high recognition-error characteristic.

23. The method of claim 21 wherein said pre-defined identification criteria include a short-duration characteristic which requires that said problematic words each be spelled with fewer than five letters.

24. The method of claim 21 wherein said pre-defined identification criteria include a common-use characteristic that is quantified by analyzing an extensive training database of speech samples to determine which of said initial vocabulary words are frequently represented in said extensive training database.

25. The method of claim 21 wherein said pre-defined identification criteria include a high recognition-error characteristic that is quantified by referring to a confusion matrix that includes separate recognition error rates for each of said initial vocabulary words in said initial speech recognition dictionary when compared with all other of said initial vocabulary words in said initial speech recognition dictionary.

26. The method of claim 21 wherein said candidate generator includes a phonetic recognizer that generates phone strings corresponding to said problematic words, said candidate generator also including a sequence analyzer that performs a multiple sequence analysis procedure upon said phone strings to produce said pronunciation candidates.

27. The method of claim 21 wherein said candidate generator includes a phonetic recognizer that sequentially processes speech data from multiple different utterances for each of said problematic words to produce individual phone strings that each represent corresponding intermediate pronunciations of respective ones of said problematic words.

28. The method of claim 21 wherein said candidate generator includes a sequence analyzer that perform one or more multiple sequence alignment procedures upon phone strings derived for each of said problematic words, said sequence analyzer aligning said phone strings, and then comparing corresponding phones in each phone position of said phone strings to determine whether said corresponding phones indicate a consensus for identifying said pronunciation candidates.

29. The method of claim 21 wherein said optimization process supports optimization functions that include selecting said pronunciation candidates, refining said pronunciation candidates, and deleting said pronunciation candidates.

30. The method of claim 21 wherein said optimization process supports optimization functions that include selecting said pronunciation candidates for said refined speech recognition dictionary by choosing from consensus pronunciation candidates, majority pronunciation candidates, and plurality pronunciation candidates.

31. The method of claim 21 wherein said optimization process supports optimization functions that include refining said pronunciation candidates by adding or removing phones from said pronunciation candidates according to refinement criteria that include phonological rules of assimilation and coarticulation, physical limitations of human vocal tracks with regard to producing certain phone sequences, contextual conditions such as inappropriate sequences of words and phones, and characteristics of dialectal and accent variations.

32. The method of claim 21 wherein said optimization process supports optimization functions that include deleting said pronunciation candidates when recognition-error rates exceed a certain pre-defined threshold error level, said recognition-error rates being accessed from a confusion matrix.

33. The method of claim 21 wherein said optimization module automatically performs said optimization process according to said pre-defined optimization criteria by utilizing an expert system.

34. The method of claim 21 wherein said optimization module generates an optimization graphical user interface for a system user to interactively participate in said optimization process for converting said pronunciation candidates into said optimized problematic pronunciations.

35. The method of claim 34 wherein said optimization graphical user interface includes a word pane that displays selected entries from said initial speech recognition dictionary that match search criteria supplied by a system user, said word pane also displaying word lengths for said selected entries, pronunciations for said selected entries, total numbers of said initial vocabulary words from said speech recognition dictionary that share common pronunciations with said selected entries, and recognition accuracy rates for said selected entries provided from a confusion matrix.

36. The method of claim 34 wherein said optimization graphical user interface includes a candidate pane that displays a consensus pronunciation candidate, a majority pronunciation candidate, and a plurality pronunciation candidate for one of said initial vocabulary words selected from a word pane.

37. The method of claim 34 wherein said optimization graphical user interface includes a pronunciation pane that shows all initial pronunciations in said speech recognition dictionary for one of said initial vocabulary words selected from a word pane.

38. The method of claim 34 wherein said optimization graphical user interface includes a confusion pane that displays selected ones of said initial vocabulary words from said initial speech recognition dictionary that have an identical pronunciation that conflicts with a selected pronunciation from a pronunciation pane, said confusion pane also displaying corresponding respective recognition error rates.

39. The method of claim 21 wherein said problematic word identifier, said candidate generator, and said optimization module are implemented as part of said dictionary refinement manager, said dictionary refinement manager producing said refined speech recognition dictionary to improve speech recognition accuracy for spontaneous speech that includes certain spoken informalities which are incorporated into said optimized problematic pronunciations.

40. The method of claim 21 wherein said refined speech recognition dictionary is utilized by said speech recognition system during speech recognition procedures instead of using said initial speech recognition dictionary, said problematic word identifier, said candidate generator, said optimization module, and said dictionary refinement manager iteratively regenerating subsequent refined speech recognition dictionaries to further improve recognition accuracy rates of said speech recognition system for spontaneous speech.

41. A computer-readable medium comprising program instructions for refining a speech recognition system by:
dividing initial vocabulary words from an initial speech recognition dictionary into problematic words and non-problematic words according to pre-defined identification criteria by utilizing a problematic word identifier;
analyzing said problematic words with a candidate generator to produce one or more pronunciation candidates for each of said problematic words;
performing an optimization process with an optimization module to refine said one or more pronunciation candidates according to one or more optimization criteria, said optimization process generating optimized problematic pronunciations; and
utilizing a dictionary refinement manager to combine said optimized problematic pronunciations with non-problematic pronunciations of said non-problematic words to produce a refined speech recognition dictionary for use by said speech recognition system.

42. A speech recognition refinement system comprising:
means for dividing initial vocabulary words from an initial speech recognition dictionary into problematic words and non-problematic words according to pre-defined identification criteria;
means for analyzing said problematic words to produce one or more pronunciation candidates for each of said problematic words;
means for performing an optimization process to refine said one or more pronunciation candidates according to optimization criteria, said optimization process generating optimized problematic pronunciations; and
means for combining said optimized problematic pronunciations with non-problematic pronunciations of said non-problematic words to produce a refined speech recognition dictionary for use by a speech recognition system.

43. A speech recognition refinement system comprising:
a word identifier configured to identify problematic words and non-problematic words according to identification criteria;
an optimization module configured to refine one or more pronunciation candidates for each of said problematic words to produce optimized problematic pronunciations; and
a refined speech recognition dictionary configured to include said optimized problematic pronunciations and non-problematic pronunciations of said non-problematic words.

44. A speech recognition refinement system comprising:
a problematic word identifier that divides initial vocabulary words from an initial speech recognition dictionary into problematic words and non-problematic words according to pre-defined identification criteria which require that said problematic words each have a short duration, be commonly used, and exhibit a high likelihood of recognition error;
a candidate generator that analyzes said problematic words to produce one or more pronunciation candidates for each of said problematic words, said candidate generator including a phonetic recognizer that generates phone strings corresponding to said problematic words, said candidate generator also including a sequence analyzer that performs a multiple sequence analysis procedure upon said phone strings to identify said pronunciation candidates;
an optimization module that performs an optimization process for refining said one or more pronunciation candidates according to one or more optimization criteria, said optimization process generating optimized problematic pronunciations, said optimization process supporting optimization functions that include selecting said pronunciation candidates in an unchanged form, refining said pronunciation candidates, and deleting said pronunciation candidates; and
a dictionary refinement manager that combines said optimized problematic pronunciations with non-problematic pronunciations of said non-problematic words to produce a refined speech recognition dictionary for use by a speech recognition system.

45. A refined speech recognition dictionary implemented by:
dividing initial vocabulary words from an initial speech recognition dictionary into problematic words and non-problematic words according to pre-defined identification criteria;
analyzing said problematic words to produce one or more pronunciation candidates for each of said problematic words;
performing an optimization process to refine said one or more pronunciation candidates according to one or more optimization criteria, said optimization process generating optimized problematic pronunciations; and
combining said optimized problematic pronunciations with non-problematic pronunciations of said non-problematic words to produce said refined speech recognition dictionary for use by a speech recognition system.

* * * * *